United States Patent
Chamaillard et al.

(10) Patent No.: US 7,635,038 B2
(45) Date of Patent: Dec. 22, 2009

(54) HEAVY VEHICLE

(75) Inventors: Jean-Marc Chamaillard, Beaumont (FR); Pierre Durif, Enval (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 155 days.

(21) Appl. No.: 11/329,486

(22) Filed: Jan. 11, 2006

(65) Prior Publication Data

US 2006/0113123 A1    Jun. 1, 2006

Related U.S. Application Data

(63) Continuation of application No. PCT/EP2004/007659, filed on Jul. 12, 2004.

(30) Foreign Application Priority Data

Jul. 17, 2003    (FR) .................................. 03 08754

(51) Int. Cl.
*B62D 61/10* (2006.01)
(52) U.S. Cl. .................. 180/22; 180/24.01; 180/24.02; 180/266
(58) Field of Classification Search ............ 180/22, 180/24.06, 24.08, 900, 905, 24.01, 24.02, 180/24.09, 266; 152/320, 376
See application file for complete search history.

(56) References Cited

U.S. PATENT DOCUMENTS

| | | | |
|---|---|---|---|
| 4,261,621 A | | 4/1981 | Fox |
| 4,359,116 A | * | 11/1982 | Mankey ............. 180/6.48 |
| 4,373,738 A | | 2/1983 | Lange |
| 5,088,570 A | * | 2/1992 | Loeber ............. 180/24.01 |
| 5,103,740 A | * | 4/1992 | Masse ............. 105/72.2 |
| 5,139,103 A | * | 8/1992 | Ducote ............. 180/24.01 |
| 5,289,905 A | * | 3/1994 | Braschler ............. 188/296 |
| 5,630,625 A | * | 5/1997 | Shaw ............. 280/838 |

(Continued)

FOREIGN PATENT DOCUMENTS

DE    26 27 149    12/1976

(Continued)

OTHER PUBLICATIONS http://images.google.com/images?hl=en&lr=&q=Terex%20Titan&sa=N&tab=wi.*

(Continued)

*Primary Examiner*—Toan C To
(74) *Attorney, Agent, or Firm*—Cohen Pontani Lieberman & Pavane LLP

(57) ABSTRACT

Presented is a heavy vehicle, such as a transport vehicle or civil engineering vehicle, of a mass greater than 500 metric tons configured to carry heavy loads and operable to generate a motive power. The vehicle includes tires of radial structure having a diameter greater than 3.5 meters and an axial width greater than 37 inches, a front steering axle coupled to at least two tires, at least one rear axle coupled to at least two tires and by which is transmitted at least part of the motive power, and a third, intermediate axle coupled to at least two tires. The intermediate axle is a steering axle and is moveable to a raised position. When the intermediate axle is in the raised position, the tires coupled to the intermediate axle are not in contact with the ground.

11 Claims, 3 Drawing Sheets

U.S. PATENT DOCUMENTS

| | | | |
|---|---|---|---|
| 6,021,719 A * | 2/2000 | Kershaw, Jr. | 105/72.2 |
| 6,105,707 A * | 8/2000 | Tamura et al. | 180/307 |
| 6,148,940 A | 11/2000 | Hokanson et al. | |
| 6,672,985 B2 * | 1/2004 | Chung et al. | 475/221 |
| 6,763,906 B1 * | 7/2004 | Momiyama et al. | 180/410 |
| 7,134,829 B2 * | 11/2006 | Quenzi et al. | 414/482 |
| 2002/0046794 A1 | 4/2002 | Durif | |

FOREIGN PATENT DOCUMENTS

| | | |
|---|---|---|
| FR | 2 093 167 | 1/1972 |
| FR | 2 464 153 | 3/1981 |
| WO | WO 00/71365 A1 | 4/2002 |

OTHER PUBLICATIONS

Liebherr Mining Equipment Co.*
"Caterpillar 797B Mining Truck Specifications", Dec. 2003, Caterpillar, USA, pp. 1-19.
Caterpillar 797B Mining Truck Specification, Dec. 2003, Caterpillar, USA, pp. 1-28; printed from the caterpillar website at the following address: http://cmms.cat.com/cmms/servlet/cat.dcs.cmms.servlet.DynamicImageServlet?imageid=C198751&imageType=9.

* cited by examiner

HEAVY VEHICLE

CROSS REFERENCE TO RELATED APPLICATIONS

This application is a U.S. Continuation Application of International Application PCT/EP2004/007659 filed Jul. 12, 2004.

BACKGROUND OF THE INVENTION

1. Field of the Invention

The invention relates to a heavy vehicle such as a transport vehicle or a "civil engineering" vehicle, of a mass greater than 500 metric tons and fitted with tires of a diameter greater than three meters fifty having an axial width greater than 37 inches.

2. Description of Prior Art

Such vehicles, generally designed for carrying heavy loads, comprise a front steering axle comprising two steering wheels and a rear axle, which is most frequently rigid, comprising four driving wheels distributed in pairs on each side.

An axle is defined as an assembly of the elements enabling the fixed structure of the vehicle to be connected to the ground.

The axial or transverse direction of the tire is parallel to the axis of rotation of the tire.

The circumferential direction of the tire, or longitudinal direction, is the direction corresponding to the periphery of the tire and defined by the rolling direction of the tire.

The axis of rotation of the tire is the axis around which it turns in normal use.

In the case of vehicles, in particular intended for use in mines or quarries for transporting loads, the problems of access and demands of production lead the manufacturers of these vehicles to increase their loading capacity. It follows that the vehicles become ever larger and thus ever heavier in themselves and are capable of transporting an ever greater load. The current masses of these vehicles may reach several hundred metric tons, the same being true of the load to be transported; the total mass may reach 600 metric tons.

Since the loading capacity of the vehicle is directly linked to that of the tires, it is known that, to increase this loading capacity, it is necessary to increase the amount of air contained in the tires.

At present, as stated above, vehicles of this type, such as dumpers used in mines, comprise a rear axle on which are mounted four wheels, arranged in pairs, to respond to these demands.

Furthermore, the dimensions of said wheels and consequently those of the tires and in particular the rigidity of the lower zones require said wheels to be made in several parts to allow mounting of the tire on a rim. The operations involved in mounting and demounting said tires in the event of replacement or maintenance are long and tedious. The number of clamping parts which have to be handled during these operations may be greater than 200, and very high levels of clamping torque are associated therewith. The time taken for these operations is consequently long and therefore detrimental to the productivity sought during exploitation of said mines.

Since current demands tend towards a constant increase in the loading capacity of these vehicles, the various parameters listed above have resulted in widening of the tires so as to increase the volume of air therein. At around 4 meters, tire diameter is now such that it is virtually impossible to increase it further, in particular for reasons of transportation of said tires. In fact, the dimensions of said tires will be limited by transportation thereof, in particular by road widths and bridge headroom. It is likewise virtually impossible to decrease the rim diameter, which in particular allows positioning of the driving torque transmission system and of the braking systems.

During their studies, the inventors have succeeded in demonstrating that these "widened" tires do effectively allow an increase in transported load but exhibit various drawbacks. Tests have in fact shown that the wear resistance of these tires is reduced with respect to that of current tires. This results in premature wear of the tires and thus a drop in the efficiency of the vehicles and a reduction in productivity.

Furthermore, patent application WO 00/71365 describes a method making it possible to simplify tire mounting, the latter being mounted directly on the hub, which serves as the rim. Independent rings then act as rim seats and are held in place by locking rings, which are connected firmly to the hub as a result in particular of being complementary in profile.

SUMMARY OF THE INVENTION

The inventors thus set themselves the task of responding to a new demand from users, who wish to see a further increase in the loading capacity of load-carrying vehicles, in particular those used in mines, the properties of the tires in terms of wear remaining unimpaired with respect to those of current tires.

This aim is achieved according to the invention by a heavy vehicle, such as a transport vehicle or a "civil engineering" vehicle, of a mass greater than 500 metric tons, fitted with tires of a diameter greater than three meters fifty having an axial width greater than 37 inches, and comprising a front steering axle provided with at least two tires and a rear axle comprising at least two tires and by which is transmitted at least part of the motive power, the vehicle comprising a third, intermediate axle, said intermediate axle being a steering axle and being capable of being lifted such that, in the raised position, the tires of said axle are not in contact with the ground.

The intermediate axle according to the invention is a steering axle, so as to allow the vehicle to follow curved courses, so reducing the risk that a vehicle may be observed continuing on a linear course when it is wished to turn.

The term "steering" must be understood for the purposes of the invention as corresponding either to a controlled intermediate steering axle or to an intermediate steering axle corresponding to self-alignment of the tires.

Advantageously, if the intermediate steering axle is controlled, it is provided according to the invention that the lock of the tires of the intermediate axle is less than the lock of the tires of the front axle.

If the intermediate steering axle corresponds to self-alignment of the tires, it is for example of the trailing arm type, that is to say with axes of rotation in front of the tires. According to this configuration, the invention furthermore advantageously makes it possible to lock the free alignment of the tires, in particular for reversing.

The tires of the intermediate axle according to the invention in particular allow participation in load bearing.

In accordance with the invention, the intermediate axle may be raised, that is to say its position relative to the ground may be varied between at least two positions, one of which allows the tires to be in contact with the ground and therefore to contribute to load bearing. The other position, or upper position, makes it possible to keep the tires at a distance from the ground. This latter position makes it possible, for example to prevent wear of said tires when the vehicle is empty, that is to say when it is not transporting a load, and therefore when the tires of the other axles are sufficient to carry the vehicle load.

According to the invention, on dry ground and when the vehicle is empty, the intermediate axle is advantageously raised to prevent any contact between the tires of said intermediate axle and the ground and therefore to diminish wear of said tires.

On soft ground and/or when the vehicle is loaded, the latter advantageously operates with the tires of the three axles in contact with the ground, so as in particular to improve the maneuverability of the vehicle. Furthermore, the involvement of the tires of the intermediate axle allows the load to be distributed over a greater number of tires and thus limits wear to the tires, in particular by preventing overload problems.

Such a vehicle embodiment makes it possible to increase the loading capacity of this type of vehicle while retaining satisfactory wear properties which are not downgraded with regard to the current situation. The inventors have demonstrated in particular that widening of the tires to achieve an increase in loading capacity, in particular when they are arranged in pairs either side of an axle, results in an increase in wear, in particular due to the presence of curved trajectories which the vehicles follow.

According to a preferred embodiment of the invention, since the vehicle is intended to carry a load and to convey it over terrain, provision is advantageously made for the longitudinal position of the intermediate axle to be a function of the load and/or of the slope of the terrain.

In other words, for example in the case of a vehicle of the dumper type designed to travel over the tracks in a mine to transport a type of mineral, for example the average load transported and the average slope of the tracks taken make it possible to define the longitudinal position which is best suited to limiting tire wear to the greatest possible degree and to improving vehicle maneuverability.

In fact, when this type of vehicle has to descend a slope transporting a large load, the load is transferred to the front of the vehicle. The tires of the front axle are then subject to a greater load. According to the invention, the presence of an intermediate axle makes it possible to distribute this load better over more tires. Furthermore, according to this advantageous embodiment of the invention, it is possible to define the longitudinal position of the intermediate axle as a function of the load and/or the slope of the terrain to achieve the most balanced distribution possible of the load over the various tires of the steering axles.

Since this type of vehicle is conventionally assembled at the place of use, the designer of the vehicle may, according to a first variant embodiment, provide several possible longitudinal positions for fixing said intermediate axle and may also provide possible adaptation of the steering and lifting systems associated with the intermediate axle. During the final phase of vehicle assembly, the position of the intermediate axle is thus selected and fixed as a function of the various parameters listed above.

According to a second variant embodiment of the vehicle according to the invention, the designer of the vehicle advantageously provides an intermediate axle at a longitudinal position which may be varied and adjusted as a function of the load carried and the slopes which the vehicle encounters. The designer then provides simultaneous adaptation of the steering and lifting systems associated with the intermediate axle.

Also advantageously, according to this second variant embodiment of the invention, the longitudinal position of the intermediate axle is servo-driven and controlled by a calculator, connected in particular to various sensors inserted in each of the tires of the steering axles, said sensors being able to establish at any given instant the operating point of the tires and thus to define the loads to which they are being subjected.

Another parameter which has to be taken into account in the design of such a vehicle is its bulk and more specifically its width. In fact, this type of vehicle is, for example, intended for use in mines, where it has to follow tracks formed in the mountainside which are in most cases of a width which is limited because they were cut to optimum size, a procedure which in itself consequently requires transportation of earth and rocks. It is clear that the vehicle embodiment according to the invention is entirely advantageous for a given load since it makes it possible to reduce the width thereof. In fact, according to the invention each of the axles may for example comprise a single tire on each side.

According to one variant embodiment of the invention, at least one axle comprises four tires arranged in pairs on either side of said axle. According to such an embodiment, the widths of the tires may be reduced relative to those of the tires of a standard vehicle comprising two axles, for a given load. In this case also, the width of the vehicle may therefore be reduced.

Also advantageously, the rear axle comprises at least four tires, of which two transmit the motive power. According to this embodiment, two tires and preferably the two axially outer tires on the rear axle do not advantageously transmit the motive power and have as their only essential function that of bearing part of the load. Such an embodiment makes it possible to reduce the longitudinal stresses arising in particular when the vehicle follows the course of a bend. In fact, when a vehicle comprising paired or twin tires follows the course of a bend, the tires which are axially furthest to the outside cover a greater distance if positioned on the outside of the bend and a smaller distance if positioned on the inside of the bend.

In the same manner, the intermediate axle advantageously comprises four tires, of which two transmit the motive power. According to this embodiment, at least two tires and preferably the two axially outer tires on said intermediate axle do not advantageously transmit the motive power and have as their only essential function that of bearing part of the load.

According to these latter variant embodiments in particular, the invention also provides for the tires of the front axle advantageously to transmit part of the motive power.

In a variant embodiment, the invention also provides for the front axle to comprise four tires, at least two tires of said front axle transmitting part of the motive power, as stated above. Preferably, the two axially inner tires are preferably the tires transmitting the motive power.

Another variant embodiment of the invention provides for at least two tires, preferably the tires of the rear axle axially to the outside, not to transmit the motive power solely when the vehicle is following a trajectory which is not rectilinear, or preferably when it is following a bend whose radius of curvature is less than a predetermined value. Such an embodiment may be achieved by a decoupling device between said tires and the members transmitting the motive power. Such a device may be controlled by the vehicle's steering members according to any means known to the person skilled in the art.

In the same manner, the invention advantageously provides for the variant in which at least two tires of the front axle transmit part the motive power to take effect only when the vehicle is following a trajectory which is not rectilinear, or preferably when it is following a bend whose radius of curvature is less than a predetermined value.

The invention also provides for a vehicle such as described above, each of whose tires is associated with an electric motor, for example incorporated in the wheel associated with the tire or in the axle hub in the vicinity of a tire in the case of an embodiment according to the method described in document WO 00/71365 examined again below.

According to these various possible embodiments, the use of electric motors associated with a tire makes it possible to distribute the motive power variably as a function of the tires and of the trajectory followed.

In the same manner, the invention also provides for some only of the tires transmitting the motive power to be controlled by electric motors; these tires may for example be the tires of the front axle, those of the rear axle retaining conventional motorization and transmission.

When the motive power is due only to the electric motors, the invention also provides for certain ones only of the tires to be associated with such electric motors and for the other tires to have only load-bearing as their essential function.

The invention also advantageously proposes to combine the vehicle as defined above with wheel-less mounting on the axles, the tires being set in place on an axle provided to this end through the intermediary of first mounting rings forming the tire bead seats and second locking rings ensuring positioning of said first rings and therefore of the tires. Mounting of this type has already been described in the above-cited patent application WO 00/71365. According to this embodiment, the invention requires that recesses be provided on the axles to accommodate the locking rings, positioning of two of these rings being necessary per tire. Such a mode of tire mounting makes it possible to improve still further the efficiency of the vehicle according to the invention, which, in addition to slower wear of the tires, allows operations to be performed more quickly in the event of tire change.

Whatever the embodiment of the invention, it is always advantageously provided for all the tires to remain individually associated with a braking device, so as to be able to slow down or stop this type of vehicle under the best conditions.

BRIEF DESCRIPTION OF THE DRAWINGS

Other advantageous details and features of the invention will become clear below from the description of examples of embodiment of the invention made with reference to FIGS. 1 to 3, in which.

To simplify understanding thereof, the Figures are not to scale. The Figures show only half of the vehicles, which extend symmetrically relative to the axis XX', which represents the longitudinal median plane of the vehicle.

DETAILED DESCRIPTION OF THE PREFERRED EMBODIMENTS

Figure 1:
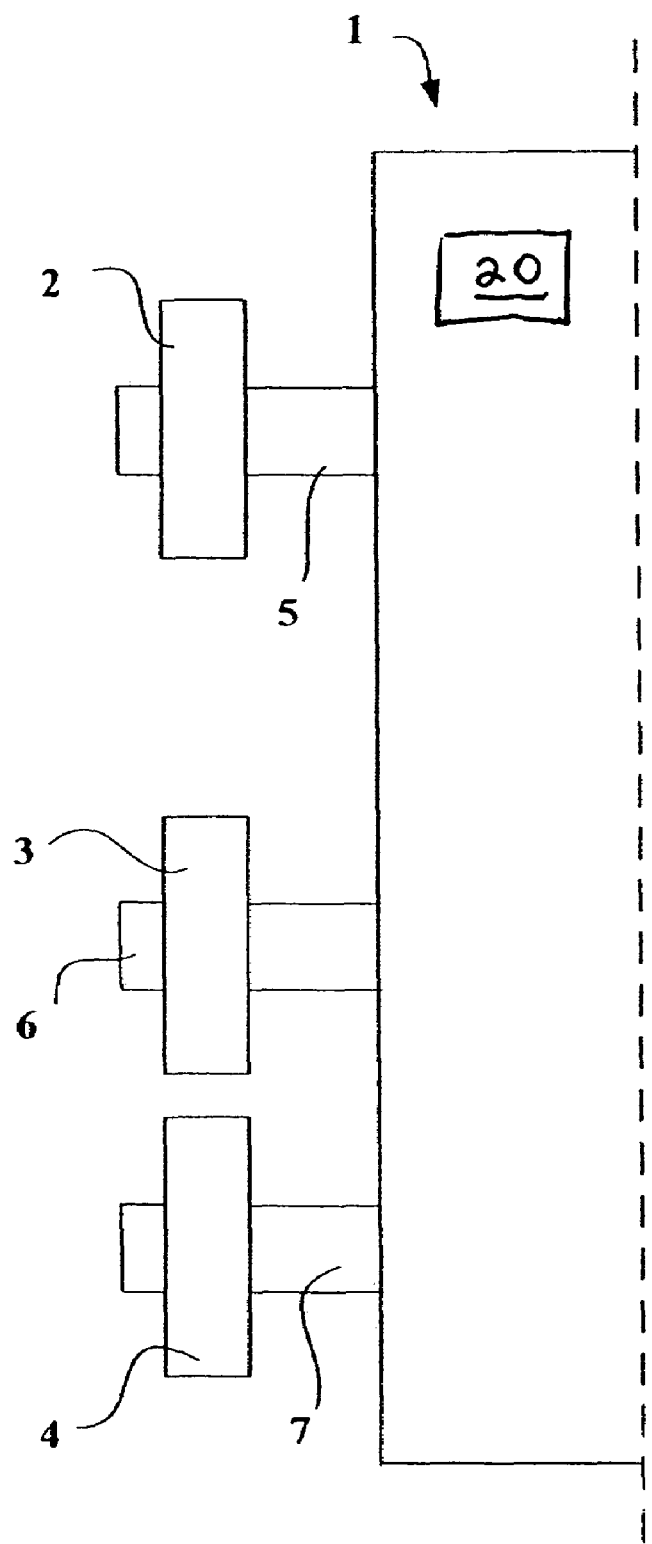
FIG. 1 shows a diagram, viewed from above, of a vehicle according to the invention.

FIG. 1 is a diagrammatic representation of a half-vehicle 1 embodied in accordance with the invention and comprising an electric motor 20 and six tires distributed over the three axles 5, 6, 7, two of said tires being steering tires on the front axle 5. Since FIG. 1 shows only half of the vehicle, only three tires 2, 3, 4 are shown.

The vehicle 1 shown diagrammatically in this FIG. 1 is a heavy vehicle having a total loaded weight of the order of 720 metric tons.

The tires with which the vehicle is fitted are large tires whose aspect ratio H/S is equal to 0.70, H being the height of the tire on the rim and S the maximum axial width of the tire when the latter is mounted on its service rim and inflated to its recommended pressure. The tires are of dimension 59/70R69.

These tires comprise a radial carcass reinforcement composed of inextensible metal cables of steel, oriented radially and anchored in each tire bead.

The tires are mounted using the method described in patent application WO 00/71365. According to this method, each axle of the vehicle is designed to receive the tires through the intermediary of rings having a surface forming the tire bead receiving seat. The surface of these rings is advantageously frustoconical in shape. The receiving rings are themselves locked on the hub of the axle through the intermediary of locking rings, one part of whose surface is complementary in shape to that of recesses provided on said hub in which said locking rings are inserted.

The intermediate axle 6 is designed to be liftable, so as to be able to raise the tire 3 if the vehicle is not transporting any load, so as not to cause wear of this tire 3 when use thereof is not necessary.

The only essential function of the tire 3 is load bearing—it does not participate in the transmission of motive power. Such an embodiment consists in fixing the tire on a system of the free wheeling type, which allows free rotation of said tire 3. The invention should not be understood as being limited to this type of embodiment: according to other embodiments, the tire 3 may transmit part of the motive power, if it is in contact with the ground.

The vehicle thus embodied allows a loading capacity greater than that of current vehicles, of the order of 1000 metric tons. The design of a vehicle of the same type, that is to say intended for the same loading capacity, equipped with four tires arranged in pairs results in the use of the same tires.

Since this type of vehicle does not exist, it was impossible to carry out tests; however calculations and simulations provide simple ways in which the person skilled in the art may acquire information about the loads transportable by said vehicles, the dimensions thereof as well as the stresses imposed on the tires and consequently an estimate of the wear and fatigue which they withstand.

Calculations of overall size were made on the basis of said two vehicles; the results obtained show that the vehicle according to the invention exhibits an axial width, measured in the direction of an axle, of 8 meters. The axial width, measured in the same manner for the rear axle of the vehicle comprising four tires arranged in pairs over said axle is 9.5 meters. This difference in size between said two vehicles makes it possible to envisage vehicles according to the invention traveling along existing tracks in mines transporting loads which are greater than the capacities of current vehicles.

Furthermore, simulations were performed to show the service lives of tires on a vehicle according to the invention and of tires mounted in pairs on the rear axle of a conventional vehicle. The results obtained according to the invention are better in terms of wear, in particular over winding courses.

The invention may provide for the tire 2 mounted on the front axle 5 also to participate in transmission of the motive power. Furthermore, the fact that the tire 2 transmits part of the motive power may improve handling of the vehicle over curved trajectories. In fact, motive power transmitted partially by the tires of the front axle 5 may facilitate following of the trajectory when these same tires are turned, in particular when the vehicle is loaded. It would appear, in fact, that under certain loading and travel conditions, handling of such a vehicle over a curved trajectory is very difficult or indeed impossible, since the vehicle does not respond to the turning imposed by the tires of the front axle. These conditions may furthermore result in splitting and destruction of the tires of the front axle.

Figure 2:
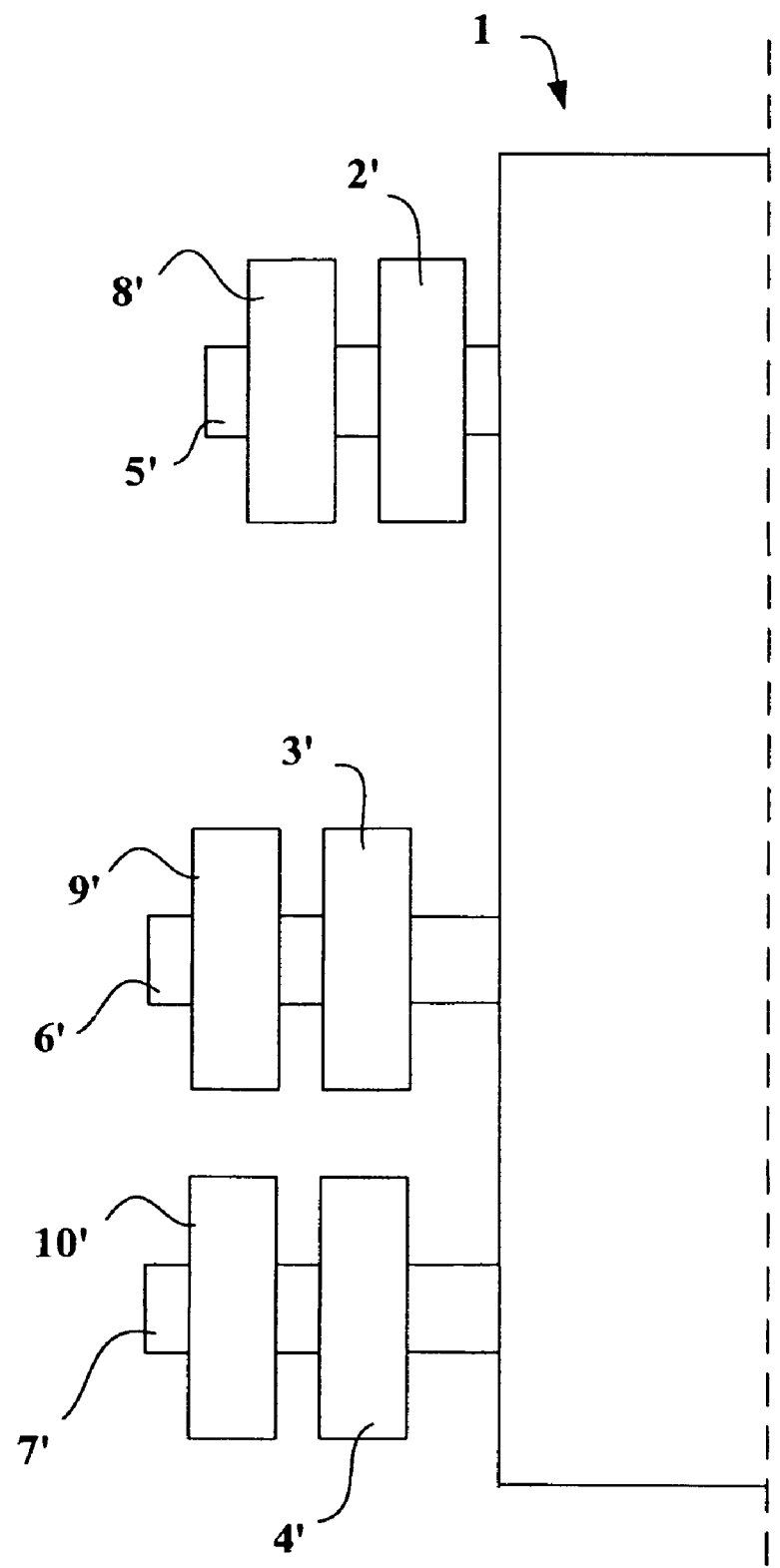
FIG. 2 shows a diagram, viewed from above, of a vehicle according to a second embodiment of the invention.

FIG. 2 illustrates another embodiment of a vehicle 1' according to the invention, which differs from the previous embodiment by the presence of supplementary tires 8', 9', 10' mounted on the various axles 5', 6, 7' and paired respectively with the tires 2', 3', 4'. The addition of these tires makes it possible to distribute the load over more tires. Such an embodiment makes it possible, for example, to increase still further the loading capacity or alternatively to permit a reduction in the dimension of the tires, in particular in the latter case with a smaller vehicle width than that of conventional vehicles for a given load. Such a configuration according to the invention may lead in particular to a loading capacity greater than 1000 metric tons.

In such an embodiment of a vehicle 1', the tires 8', 9', 10' may have the sole function of bearing part of the load. According to other variant embodiments, the tires 8', 9', 10', or certain ones thereof, may participate in transmission of the motive power either permanently or temporarily, as mentioned above, or alternatively variably, for example by using electric motors.

The invention also provides examples of embodiment which are not illustrated, in which the vehicle may comprise tires arranged in pairs on either side of an axle on only one of the axles or two of the axles.

Figure 3:
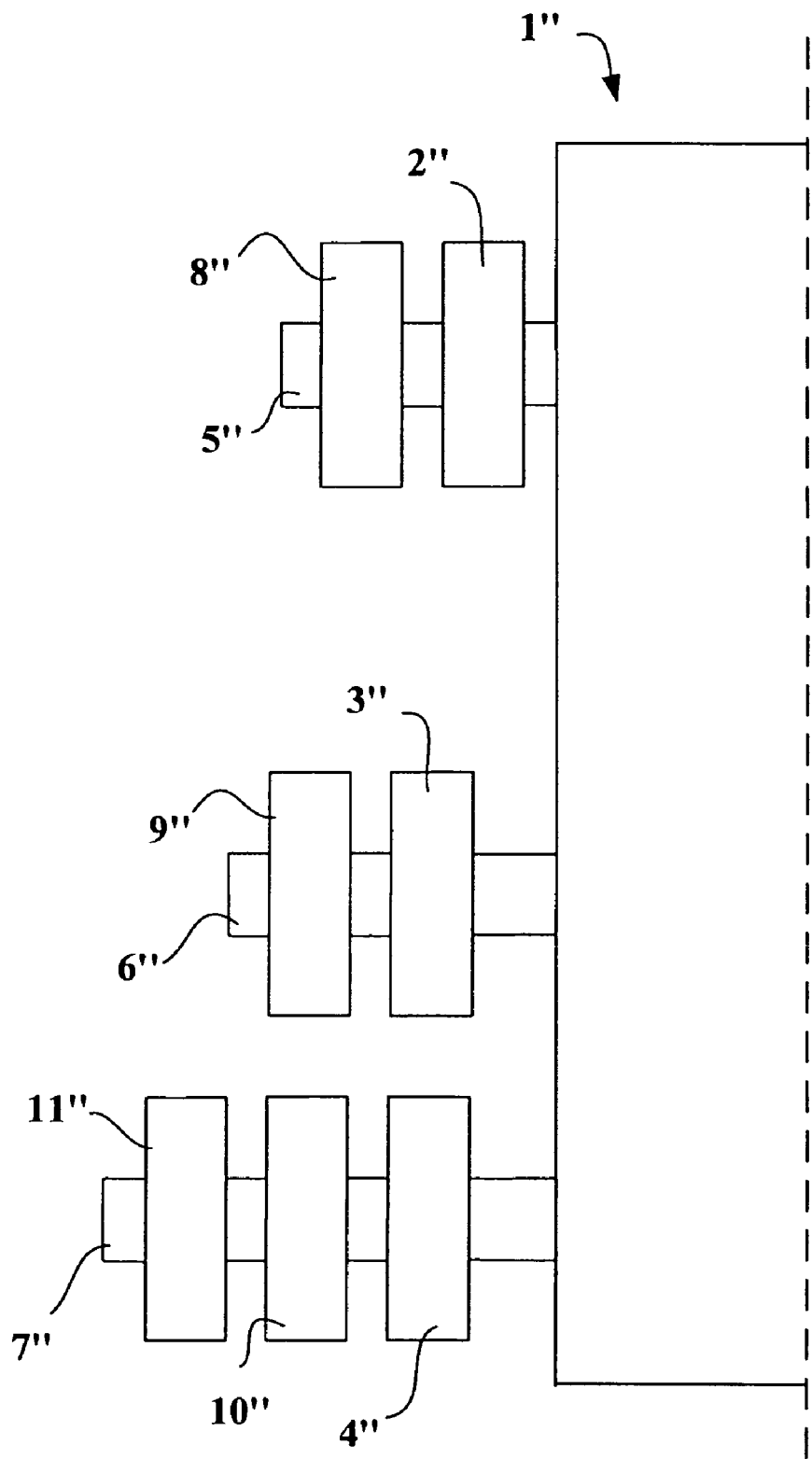
FIG. 3 shows a diagram, viewed from above, of a vehicle according to a third embodiment of the invention.

FIG. 3 illustrates a last embodiment of a vehicle 1" according to the invention, which differs from the previous embodiment by the presence of supplementary tires 11" mounted on the rear axle 7" and associated with the tires 4" and 10". The addition of these tires makes it possible to distribute the load over more tires. Such an embodiment makes it possible, for example, to increase still further the loading capacity or alternatively to permit a reduction in the dimension of the tires, in particular in the latter case with a smaller vehicle width than that of conventional vehicles for a given load. Such a configuration according to the invention may lead in particular to a loading capacity of the order of 1400 metric tons.

In such an embodiment of a vehicle 1", the tires 8", 9", 10" and 11" may for example have the sole function of bearing part of the load. According to other variant embodiments, the tires 8", 9", 10" and 11" or certain ones thereof may participate in transmission of the motive power either permanently or temporarily, as mentioned above, or alternatively variably, for example by using electric motors.

What is claimed is:

1. A heavy vehicle of a mass greater than 500 metric tons configured to carry heavy loads over a terrain and operable to generate a motive power, the vehicle comprising: tires of radial structure having a diameter greater than 3.5 meters and an axial width greater than 37 inches;
a front steering axle coupled to at least two of the tires;
at least one rear axle coupled to at least two of the tires and by which is transmitted at least part of the motive power; and
a third, intermediate axle coupled to at least two of the tires;
wherein said intermediate axle is a steering axle and is moveable to a raised position, and when the intermediate axle is in the raised position, the tires coupled to said intermediate axle are not in contact with the ground, and a longitudinal position of the intermediate axle is a function of at least one of the load and the slope of the terrain.

2. The vehicle according to claim 1, wherein the at least one rear axle is coupled to four of the tires.

3. The vehicle according to claim 1, wherein the rear axle is coupled to at least four of the tires transmitting the motive power.

4. The vehicle according to claim 1, wherein the rear axle is coupled to at least four of the tires and wherein two of the at least four of the tires coupled to the rear axle transmit at least part of the motive power.

5. The vehicle according to claim 1, wherein the front axle is coupled to at least two of the tires transmitting part of the motive power.

6. The vehicle according to claim 1, wherein the front axle is coupled to four of the tires and wherein two of the at least four of the tires coupled to the front axle transmit at least part of the motive power.

7. The vehicle according to claim 1, wherein the intermediate axle is coupled to at least two of the tires transmitting part of the motive power.

8. The vehicle according to claim 1, wherein the intermediate axle is coupled to four of the tires and wherein two of the four of the tires coupled to the intermediate axle transmit at least part of the motive power.

9. The vehicle according to claim 1, wherein at least some of the tires transmitting the motive power are controlled by an electric motor.

10. The vehicle according to claim 1, wherein the intermediate axle is connectable to the vehicle at a plurality of different longitudinal positions.

11. The vehicle according to claim 1, wherein the longitudinal position of the intermediate axle is variable, the longitudinal position of the intermediate axle being selectable as a function of at least one of the load and the slope of the terrain.

* * * * *